United States Patent [19]

Gustafson

[11] Patent Number: 5,365,692
[45] Date of Patent: Nov. 22, 1994

[54] METHOD AND APPARATUS FOR EXTERMINATING PESTS

[75] Inventor: Keith W. Gustafson, Waleska, Ga.
[73] Assignee: KGK Ecosystems, Inc., Marietta, Ga.
[21] Appl. No.: 57,632
[22] Filed: May 7, 1993
[51] Int. Cl.[5] .................... A01M 13/00; A01M 1/24
[52] U.S. Cl. ..................................... 43/124; 43/132.1
[58] Field of Search .................. 43/124, 125, 132.1, 43/129, 121, 131

[56] References Cited

U.S. PATENT DOCUMENTS

| | | | |
|---|---|---|---|
| 1,119,398 | 12/1914 | Bullot | 43/125 |
| 1,501,958 | 7/1924 | Mackie | |
| 1,725,650 | 8/1929 | Kobiolke | |
| 1,743,660 | 1/1930 | Edwards | 43/125 |
| 1,849,194 | 3/1932 | McCurrie | 43/125 |
| 1,861,736 | 6/1932 | Bersie | 43/125 |
| 2,119,837 | 6/1938 | Wehrle | 43/124 |
| 2,149,936 | 3/1939 | Collins | 43/125 |
| 4,239,731 | 12/1980 | Gillis et al. | 422/112 |
| 4,889,708 | 12/1989 | Latif et al. | 43/125 |
| 4,944,919 | 7/1990 | Powell | 422/26 |
| 4,966,755 | 10/1990 | Smith | 43/125 |
| 4,989,363 | 2/1991 | Doernemann | 43/124 |
| 5,165,199 | 11/1992 | Tallon | 43/124 |

OTHER PUBLICATIONS

Chapter 7–Vacuum Fumigation from Manual of Fumigation for Insect Control–2nd Ed. Published 1969.

*Primary Examiner*—P. Austin Bradley
*Assistant Examiner*—Chuck Y. Mah
*Attorney, Agent, or Firm*—Jansson & Shupe, Ltd.

[57] ABSTRACT

Disclosed is a method for killing animal pests infesting a water-bearing product and including placing the product in a chamber having at least some oxygen therewithin and reducing the pressure in the chamber below atmospheric pressure. The improvement comprises the steps of reducing the pressure in the chamber at least to the boiling point of the water in the product so that oxygen in the chamber is displaced by water vapor until the chamber is substantially oxygen depleted. The oxygen depleted condition is maintained for the "time of lethality," i.e. for a time at least equal to the time required for a pest to be killed in an oxygen-depleted environment. Specific aspects of the new method also involve using inert gas and a poison gas fumigant.

17 Claims, 5 Drawing Sheets

METHOD AND APPARATUS FOR EXTERMINATING PESTS

FIELD OF THE INVENTION

The invention relates generally to processes and apparatus for destroying living organisms and, more particularly, to a method and apparatus for exterminating animals which have infested certain types of products.

BACKGROUND OF THE INVENTION

Products obtained from plants form an important part of the economies of many (even perhaps most) states and countries. While an exhaustive list may fill several pages, examples include grains, lumber, nuts, fruits, vegetables and the like.

Often, such products are used by buyers foreign to the political jurisdiction in which the product is grown.. Of necessity, such products must be shipped across political boundaries, perhaps several such boundaries while moving from such site to the place where the product is finally used.

For example, the States of Georgia, California, Florida and Texas and the countries of Mexico, Brazil and Guatemala (to name just a few) have substantial agricultural economies. Products grown within those jurisdictions may be shipped all over the world. And, similarly, those states and countries receive agricultural products from other jurisdictions.

One of the risks arising from such "inter-jurisdictional" trade is that an aspect of the local agricultural industry may be endangered, perhaps critically endangered, by animals infesting the product or by crop diseases carried by such animals. As used in this specification, the term "animals" means insects larvae or adult form), mammals (e.g., rats and mice), reptiles and/or birds.

Such animals may and frequently do infest the product at the site of packing and/or during transit and unless precautionary steps are taken, great harm can come to an agricultural economy to which the animal or the disease is foreign. Under those relatively narrow circumstances, the aforementioned animals must be considered as pests. Merely as an example of the type of precaution commonly taken (evidence of the potential seriousness of the problem), motorists travelling between Canada and the United States or into certain states in the United States are routinely asked whether they are carrying fruits or vegetables or certain types thereof which may carry vegetable disease.

As a result of such commonly-occurring product animal infestation, states and countries take special precautions to assure that animals "hitchhiking" in products crossing political boundaries are killed before entering the jurisdiction so that they cannot directly or indirectly impair the local agricultural industry. Animal exterminating may be carried out at the boundary itself or at loading, unloading or storage points enroute.

It is also to be appreciated that pests indigenous to a jurisdiction may contaminate a product. In fact, the inventive method and apparatus find greatest utility in killing indigenous insect pests in food products since live pests are considered to be food contaminants.

A commonly-used approach is to fumigate the load of product, which may be transported by rail car, over-the-road semi-trailer, ship or the like. Loads in rail cars or semi-trailers are typically fumigated by first sealing cracks and openings in the car or trailer as well as reasonably possible. Complete sealing is not practically possible. Then a can of methyl bromide, a commonly-used fumigant, is opened and tossed into the car or trailer. The doors are closed and the fumigant left to diffuse through the product.

A somewhat similar approach is commonly used with bagged, shipborne products such as cocoa and coffee beans. The bags are unloaded to the dock, covered with a tarpaulin and one or more open cans of methyl bromide placed beneath the tarpaulin and left to diffuse through the product.

However, treating the load with, e.g., methyl bromide is not the end of the process. After the fumigant has presumably fully diffused through the product and killed any animals therein, the load must be ventilated or permitted to ventilate to remove all traces of the fumigant which is poisonous to humans and other types of life.

And the effectiveness of the process can only be determined by inspection. Experience has demonstrated that such processes, which are fairly described as being a bit haphazard, are sometimes less than fully effective in killing all animals present in the load.

Another, less-commonly-used process involves placing the load in a large container vessel, sealing the vessel and releasing a poison gas fumigant into the vessel load is then held in the sealed vessel until the gas fully diffuses throughout the load, killing animals which may be present. Following animal extermination, the is ventilated for the reasons mentioned above.

Examples of apparatus in this general field are depicted in U.S. Pat. Nos. 1,501,958 (Mackie); 1,725,650 (Kobilke); 4,239,731 (Gillis et al.) and 4,944,919 (Powell). The process described in the Mackie patent is said to be useful in destroying animal life in fabrics, food products, hides and plants. In such process, a product is placed in a shell, the shell sealed and the pressure in the shell reduced below atmospheric ambient pressure.

A mixture of air and a fumigant, carbon disulphide, is then introduced into the shell, being drawn thereinto by the partial vacuum. Such introduction causes the pressure in the shell to rise to about atmospheric ambient and the product is held in the shell for a period of time. The patent states that such time may be "sixty minutes or in some cases longer" but there is no clue to the volume of the load or to what specific types of products may be treated.

The process described in the Kobiolke patent also involves placing "food products" or "other material" in a kiln and reducing the kiln pressure below atmospheric ambient to partially remove oxygen. As further described in such patent, the partial vacuum is then used to introduce carbon monoxide to absorb additional oxygen the kiln pressure rises to ambient pressure as a result of such introduction. The kiln pressure is again reduced and carbon bisulphide is introduced to destroy insect pests. Then air is permitted to rush into the kiln and such air (along with circulating fans) cleanses the material being treated. Presumably, this means the material is ventilated until free of poisonous carbon bisulphide.

While the foregoing processes have been the best available until the invention, such processes are attended by certain disadvantages. Some of these are readily apparent and some are not so apparent.

An obvious disadvantage is that all of the aforementioned processes use poisonous gas fumigants. Unless the product is thoroughly ventilated, traces thereof may linger to be later consumed by humans and animals. Another obvious disadvantage is that in many instances, the fumigant is simply allowed to dissipate in the air with consequent pollution of the environment. And certain fumigants are known to deplete ozone.

A less-apparent disadvantage—but one which dramatically influences the time required to carry out the known processes—is that because there is little of no air movement within the load being treated, the poison gas fumigant must propagate through such load by diffusion. Diffusion is slow; it is common to require six to forty-eight hours for complete fumigant diffusion in a large load. An animal exposed to a fumigant may be killed after a few minutes of exposure but it may take a day or two for such fumigant to propagate deeply into the interior of the product load to reach the animal.

The long time required is especially true with loads of "dense" products, i.e., those having only a few, very small interstices. Baled tobacco, stacked lumber and the like are examples of products having very little air space between individual product constituents.

Yet another disadvantage is that such processes may or will, as a practical matter, be prohibited in the near future. Methyl bromide is being banned by the U.S. Environmental Protection Agency and the use of other popular fumigants may be severely restricted.

Still another disadvantage is that at least as to the process described in the Kobiolke patent, multiple gaseous constituents are needed to carry it out. This results in unnecessary constituent storage and handling.

Yet another disadvantage of the prior art processes is that they are not entirely reliable in killing all animals present within a "batch" of products. This is especially true of products like coffee and cocoa beans treated as described above. At least at the edges of the stack, air is likely to seep in and impair or destroy the effectiveness of the fumigant. Consequently, product inspections must be carried out—and it is left to the imagination to say how one readily inspects the interior of a bag of cocoa beans.

An improved method and apparatus which materially shortens process time, which can be carried out without the use of fumigants, which can avoid the need for product ventilation and which avoids environmental pollution would be an important advance in the art.

OBJECTS OF THE INVENTION

It is an object of the invention to provide an improved apparatus and method for exterminating pests which overcomes some of the problems and disadvantages of the prior art.

Another object of the invention to provide an improved apparatus and method for exterminating pests which dramatically reduces process time.

Yet another object of the invention to provide an improved apparatus and method for exterminating pests which, in certain versions, avoids using poison gas fumigants.

Another object of the invention to provide an improved apparatus and method for exterminating pests which, in other versions, recovers poison gas fumigants and prevents their entry into the environment.

Still another object of the invention to provide an improved apparatus and method for exterminating pests which, because of its uniformity of result, helps avoid the need for detailed post-process product inspection. How these and other objects are accomplished will become apparent from the following descriptions taken in conjunction with the drawing.

SUMMARY OF THE INVENTION

The invention involves a method for killing animal pests infesting a water-bearing product and including placing the product in a chamber having at least some oxygen therewithin and reducing the pressure in the chamber below atmospheric pressure. The improvement comprises the steps of reducing the pressure in the chamber at least to that at which water in the product boils. (Parenthetically, it will be recalled that as pressure is reduced below atmospheric ambient, the boiling temperature of water also declines.) The oxygen in the chamber is thereupon displaced with water vapor until the chamber is substantially oxygen depleted.

At some point during the process or before starting it, a pest oxygen-depleted time of lethality is determined. The expression "pest oxygen-depleted time of lethality" means the time required for the pest to be killed in a substantially oxygen-depleted environment. Some examples are given in the detailed description.

The oxygen-depleted condition is maintained for a time at least equal to the time of lethality. Thus, all or substantially all of the pests are destroyed.

In one aspect of the invention, the pressure in the chamber is reduced by evacuating the chamber with a vacuum system providing a first, more rapid evacuation rate or a second, slower evacuation rate. The pressure reducing step includes evacuating the chamber at the more rapid evacuation rate until the pressure in the chamber is substantially equal to that at which water in the product boils and the pressure maintaining step includes evacuating the chamber at the slower evacuation rate to maintain the pressure substantially equal to the boiling point of the water boils. As explained in the detailed description, it may be desirable with certain types of products to moderate even the initial evacuation rate.

Another aspect of the invention involves a substantially leakproof chamber. In that instance, the pressure in the chamber is reduced by evacuating the chamber with a vacuum system and the chamber is sealed to prevent entry of surrounding ambient air. The pressure maintaining step can then include disabling the vacuum system, thereby avoiding further chamber evacuation.

In yet another aspect of the invention, the condition maintaining step includes flowing a gas into the chamber, thereby permitting chamber pressure to rise toward atmospheric ambient pressure. The gas may include an inert gas or a fumigant. The fumigant flowing step includes flowing fumigant into the chamber to raise the chamber pressure toward atmospheric pressure and the method includes the further steps of re-evacuating the chamber to reduce the chamber pressure at least to that at which the water in the product and displacing fumigant remaining in the chamber with water vapor.

For reasons alluded to above, it is highly desirable to recover the displaced fumigant. Therefore, the fumigant displacing step may be accompanied by the step of recovering the displaced fumigant, thereby preventing such fumigant from being released into the atmosphere.

And pest extermination may not be the only concern when using the inventive method. Certain kinds of products are packed in receptacles, e.g., boxes, crates, containers or the like, which may have a maximum pressure differential rating to avoid receptacle rupture. Such receptacles may or may not have leakage paths in the form of cracks or other types of relatively small openings. If there are such paths, they permit the pressure in the receptacle to rather closely "follow" the declining pressure in the chamber. Thus, the pressure differential rating is not exceeded and, usually, not even approached.

However, there may be receptacles of products which are quite tightly sealed and, thus, have leakage paths of very small cross-sectional area. In that instance, the pressure reducing step includes reducing the pressure at a rate to avoid exceeding the receptacle pressure differential rating and, thus, avoid "blowing out" the receptacle.

Similarly, the pressure maintaining step is followed by the step of increasing the chamber pressure at a rate to avoid exceeding the receptacle pressure differential rating. This avoids deforming or crushing the receptacle (and the product within) as would otherwise result from having a pressure exterior the receptacle which exceeds its internal pressure by a value greater than a maximum pressure differential rating.

The new method can be used in other beneficial ways. It is recognized that contraband controlled substances, e.g., cocaine, heroin or the like, are sometimes secreted in shipments of otherwise-innocuous products. In recognition of that possibility and as the pressure reducing step evacuates gas from the chamber, such step is accompanied by the step of flowing the evacuated gas through a controlled substance analyzer for detecting a contraband controlled substance in the chamber. Or the evacuated gas may be "stored" temporarily and flowed through a controlled substance analyzer following the pressure reducing step.

It is relatively rare to encounter products presented for processing by the new method which are at a temperature in excess of 100° F. Therefore, in a preferred method, the pressure in the chamber is reduced to at least about 2" Hg Abs. which is the pressure at which water at 100° F. boils.

On the other hand, it is also relatively rare to encounter products at a temperature as low as 32° F. In that instance, the pressure in the chamber is reduced to about 0.18" Hg Abs. which is the pressure at which water at that temperature boils. More commonly, the invention is used to process products at a temperature of about 70°-80° F. A chamber pressure of about 1.0" Hg Abs. will boil water at that temperature.

Of course, products at other temperatures, higher or lower, may be encountered. Therefore, it should be appreciated that even though not specifically mentioned above, the invention contemplates reducing chamber pressure to a value at which water at a particular temperature boils.

In another aspect of the invention, the method need not rely upon the presence of water in a commercial product although it is difficult to imagine an organic product which does not contain some amount of water. In a method for killing an animal pest having a nominal body temperature and infesting a dry product, the method including placing the product in a chamber having at least some oxygen therewithin and reducing the pressure in the chamber below atmospheric pressure.

It has been found that water vaporizing or "boiling" from the pest's body prevents the pest from replenishing its oxygen supply, even in the presence of oxygen in the surrounding environment. The method comprises, in either order, the steps of reducing the pressure in the chamber at least to the pressure at which water in the pest is body boils and determining a pest oxygen-depleted time of lethality. Such method also includes the step of maintaining the pressure in the chamber substantially equal to such boiling point for a time at least equal to the time of lethality. The pressure maintaining step includes permitting water in the pest body to vaporize, thereby substantially preventing oxygen from entering the body.

Aspects of the invention also involve an apparatus for killing animal pests infesting a dry or an organic (water-bearing) product. Such apparatus includes a product holding chamber and a vacuum system for reducing the pressure in the chamber below atmospheric ambient pressure.

The vacuum system is capable of reducing the pressure in the chamber to the pressure at which water in the product boils. Such system should be capable of reducing the pressure in the chamber to at least 2" Hg Abs. and, more preferably, capable of reducing the pressure in the chamber even down to about 0.02" Hg Abs. which is the pressure at which ice at −20° F. sublimes.

The apparatus may also include a tank selectively connected to the chamber and containing an inert gas which can be flowed into the chamber as mentioned above. It may also include a vessel selectively connected to the chamber for recovering a poison gas from the chamber.

As used in this specification, the terms "product," "organic product" and "water-bearing product" are synonymous. The terms "dry product" and "inorganic product" are synonymous and mean a product substantially devoid of water. Yet other aspects of the invention are set forth in the following detailed description and the drawing.

DETAILED DESCRIPTION OF PREFERRED EMBODIMENTS

Figure 1:
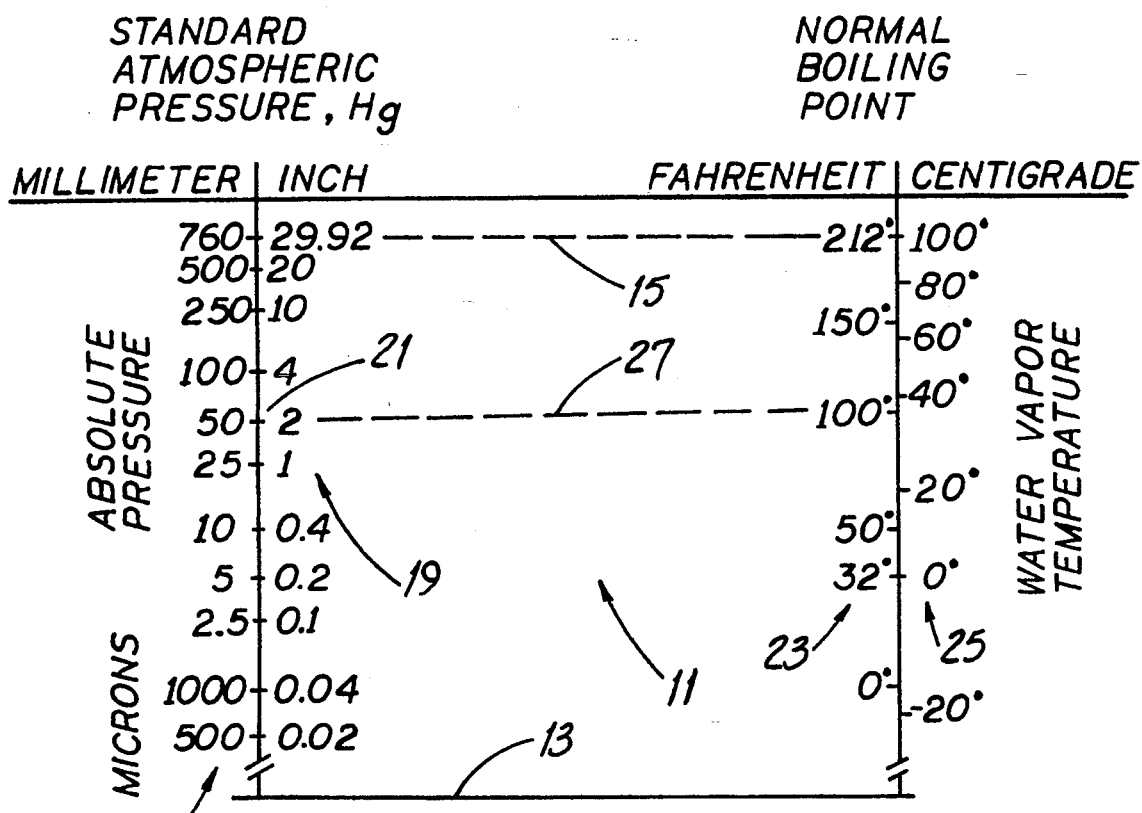
FIG. 1 is a chart correlating different pressure and temperature "conventions" or units of measurement and correlating the boiling temperature of water with below-ambient pressure.

Aspects of the invention involve using pressures below ambient atmospheric pressure. Since pressure per se and the units of measuring pressure can be very confusing, this specification first explains some "conventions" for pressure measurement. It also explains how the boiling temperature of water relates to pressure.

"Systems" of Pressure Measurement

Pressure can be measured in terms of vacuum or "relative" pressure or in terms of absolute pressure. To illustrate this point, earth's nominal atmospheric ambient pressure at sea level is commonly (although often implicitly) referred to as being zero pounds/square inch (p.s.i.). Auto tires commonly have rated pressure of 35 p.s.i. and this means 35 p.s.i. above (or relative to) atmospheric ambient pressure. That is, in that form of usage, atmospheric ambient pressure is implicitly recognized as being zero. And a pressure of, for example, −10 p.s.i. is assumed to mean 10 p.s.i. below atmospheric ambient pressure. Using negative numbers to indicate pressure is sometimes referred to as the vacuum system of pressure measurement.

However, every student of high school physics also knows that nominal sea level atmospheric ambient pressure is normally stated to be about 14.7 p.s.i. While it may be less clearly recalled by such students, such pressure is as measured on the "absolute" scale. In this "convention" of pressure measurement, that state which would be at zero p.s.i. Abs. is a complete vacuum.

A complete vacuum (which can be closely approached but has not yet been reached in practice) would exist in a closed container having no gas molecules therein. Indicating pressure using an absolute scale never involves using negative numbers since the absolutely lowest pressure theoretically attainable is zero. That is, there are no pressures possible below zero and, in fact, only the "absolute" system of pressure measurement is accurate per se. In this specification, the absolute convention of pressure indication and measurement will be used unless stated otherwise.

To make matters seemingly more difficult, there are several units of measure which can be used to indicate absolute (as well as relative) pressure. Some of them are "inches of water," "inches (or ″) of Hg," "millimeters (mm) of Hg" and others. This means that a particular pressure is sufficient to support a column of water or mercury of a particular length. It is very common to have barometric pressure announced by meteorologists in "inches" (e.g., "The barometer is 29.7 inches and steady.") What is not often stated is that such pressure is in inches of mercury and is an absolute, not relative, pressure measurement.

Water Boiling Temperatures

Turning now to the matter of the boiling temperature of water, it is commonly understood that such boiling temperature is 212° F. Implicit in that temperature is the fact that it is measured at nominal sea level pressure, i.e., zero p.s.i. relative pressure which is equal to 14.7 p.s.i. Abs. pressure. But the boiling temperature of water varies with pressure. Two examples help illustrate this point.

Mount Everest has a peak height in excess of 29,000 feet where the pressure is about 4.4 p.s.i (9″ Hg Abs.) Persons who have climbed that and other high mountains find it more difficult to cook food there by boiling it in water. This is so since the boiling temperature is reduced due to the reduced air pressure at that altitude. The boiling temperature of water at the peak of Mount Everest is about 158° F.

Automotive cooling systems operate at relative pressure above atmospheric pressure, usually stated as zero p.s.i. Such systems are equipped with a pressure cap which prevents the system pressure from exceeding, say, 15 p.s.i. (relative) but which also permit the liquid coolant (the mixture of antifreeze and water) to attain, if necessary, a temperature in excess of about 250° F. without boiling. (Parenthetically, the normal operating temperature of such a system is well below 212° F. Pressurized systems are used to add extra "range" thereto.)

It is well recognized that if the pressure cap is removed when the coolant temperature is above 212° F., the coolant instantly boils. It is this phenomenon which underlies the fact that automobile owner's manuals caution owners against opening the cooling system cap while the system is hot.

The above explanation will be made more clear by reference to the chart 11 of FIG. 1 and the following comments. In FIG. 1, the line 13 represents zero pressure on the absolute scale. That is, such line 13 represents a perfect vacuum. Thus, in the absolute system of pressure measurement, all pressures will, when graphically represented, be above the line 13.

The dashed line 15 represents atmospheric ambient pressure, also in "absolute" terms. That is, such line represents 14.7 p.s.i. Abs. In other units of measure, such line 15 also represents atmospheric ambient pressure (in "mm Hg") to be 760 mm Hg and (in ″ Hg) to be 29.92 since the scale 17 represents pressure in mm Hg and the scale 19 represents pressure in ″ Hg. Scales 17 and 19 visually, graphically correlate pressure in two different units of measurement. As an example and as indicated at the location 21, an absolute pressure of 50 mm Hg is equal to 2″ Hg pressure. This is not surprising—in linear measurement, 25 mm is about equal to an inch.

FIG. 1 not only correlates pressure in two of several possible different units of measurement, it also correlates the boiling temperature of water with pressure. Water boiling temperature is represented in degrees Fahrenheit by the scale 23 and in degrees Celsius or centigrade by the scale 25. The line 15 also represents a boiling temperature of 212° F. which is equal to 100° C.

From an inspection of the relative vertical positions of the pressure scales 17, 19 on the one hand and the temperature scales 23, 25 on the other, it is now visually apparent that water boiling temperature is a function of pressure. Considering the dashed line 27, such line 27 illustrates that the boiling temperature of water is about 100° F. (about 39° C.) at a pressure of about 2″ Hg (about 50 mm Hg.)

The Inventive Method

Referring now to FIGS. 2 through 8, the inventive method will now be described. The method involves killing animal pests 29 infesting a water-bearing product 31 such as fruit, lumber, grain or the like. Animal pests 29 may include insects 29a, reptiles 29b, mammals 29c or even birds 29d although it is unlikely that all would be found in the same load of product 31. In fact, destruction of insects 29a is the primary concern.

Figure 7:
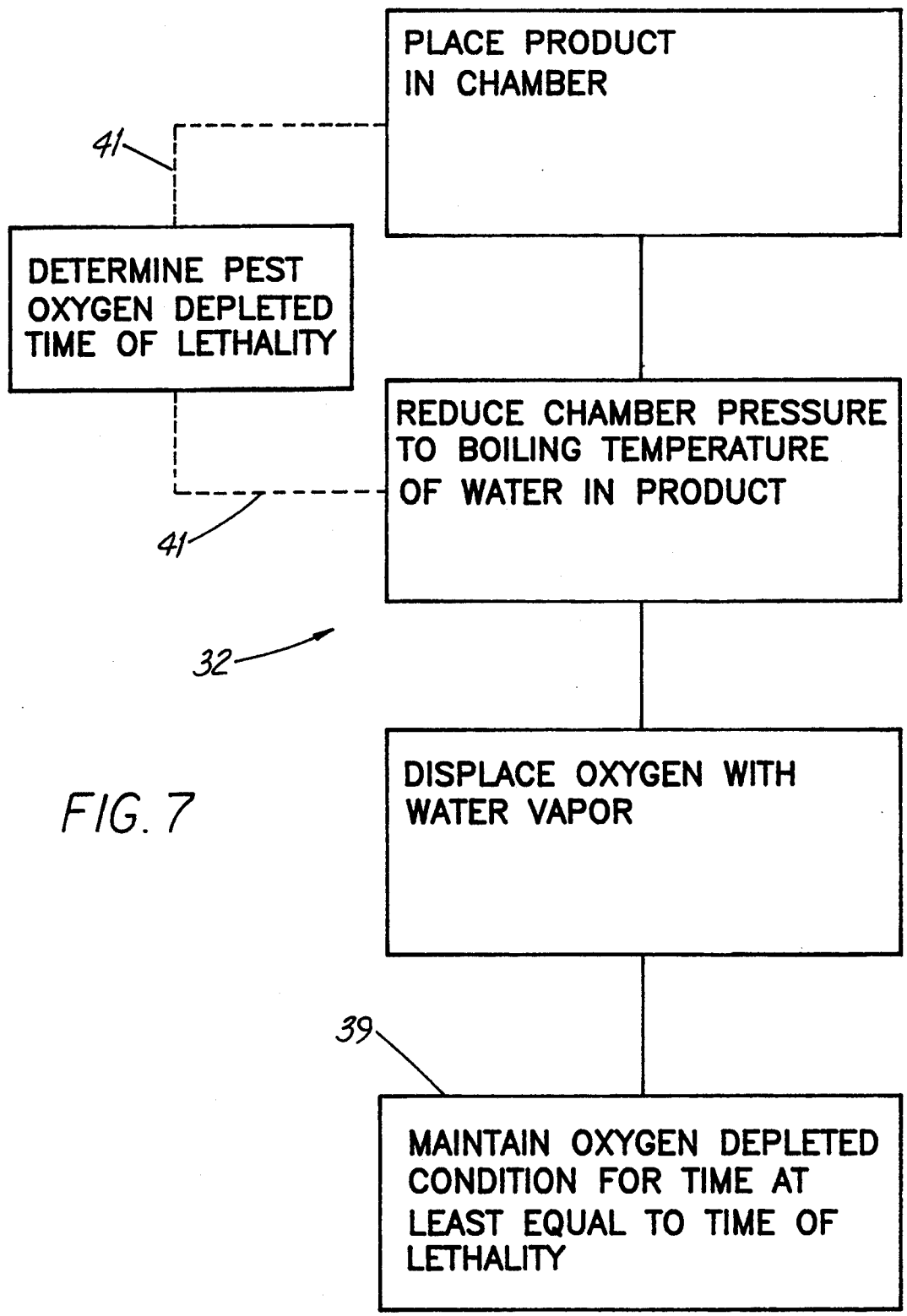
FIG. 7 is a flow chart showing steps of the inventive method.
Figure 8:
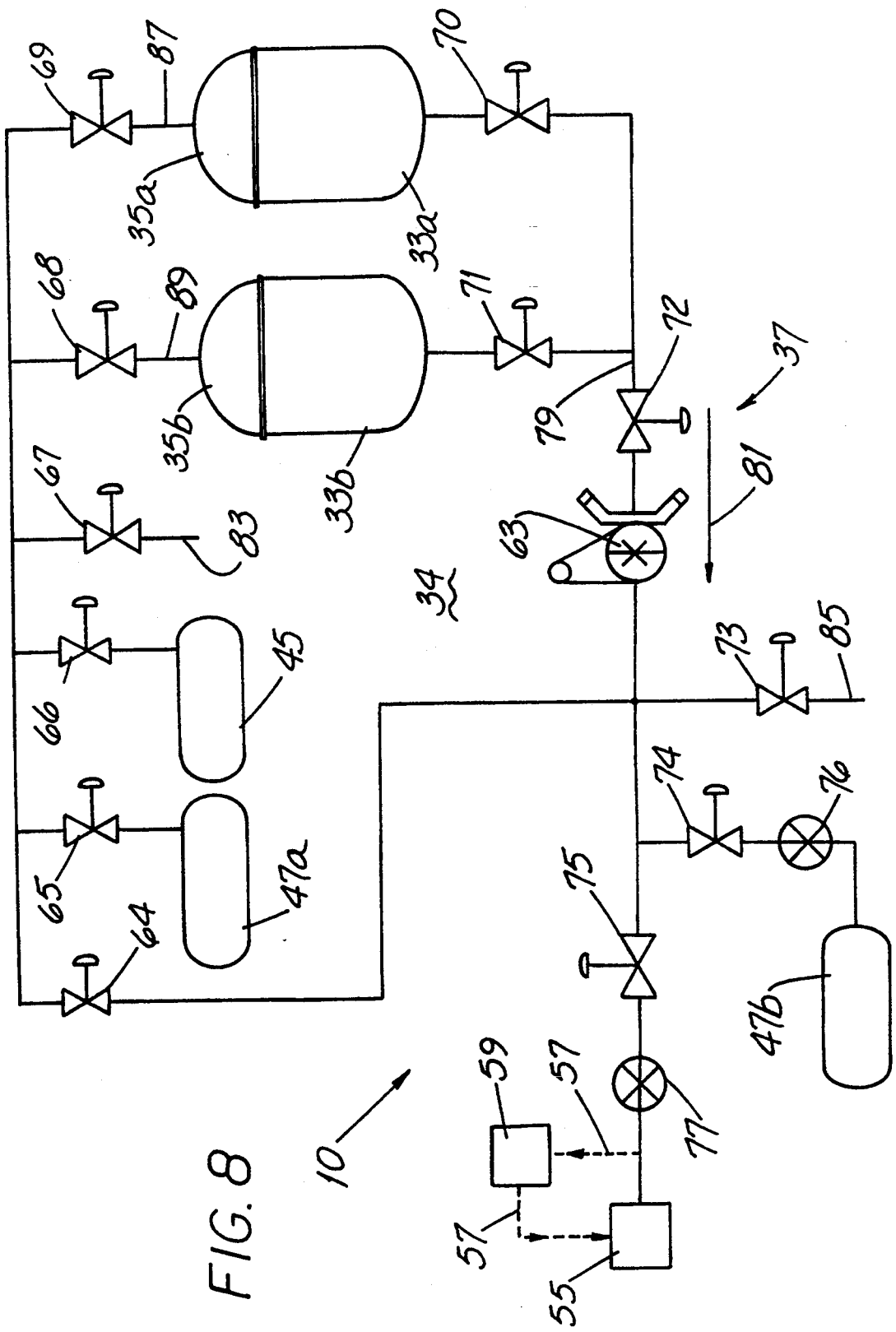
FIG. 8 is a schematic diagram of apparatus useful in carrying out the new method.

Referring particularly to the flow chart 32 of FIG. 7 and the schematic diagram 34 of FIG. 8, the product 31 is placed in a chamber 33a or 33b which almost inevitably has at least some oxygen in it since, when not in use, the chamber door 35a, 35b is often open to atmosphere. (Two chambers 33a, 33b are shown and the reason therefor is explained below. For this part of the description, it is assumed that only one of such chambers 33a or 33b is used and such chamber is referred to as "33".)

With the door 35 closed, the pressure in the chamber 33 is reduced below atmospheric pressure at least to that temperature at which the water in the product 31 boils. The oxygen in the chamber 33 is thereupon displaced with water vapor until the chamber 33 is substantially oxygen depleted. That is, as the vacuum system 37 continues to operate, that gaseous substance which is withdrawn by from the chamber 33 includes oxygen as well as some increasing amount of water vapor. But the point is that as water in the product 31 boils, its vapor fills the chamber 33.

At some point during the process or before starting it, a pest oxygen-depleted time of lethality is determined. In fact, such time need not be determined until after starting the pressure-maintaining step as represented by the symbol 39. However, if there is too much delay in making that determination, the pressure be maintained unnecessarily long and the best economic potential of the method will not be utilized. The dashed lines 41 show the span of activity during which such determination is normally made. The oxygen-depleted condition is maintained for a time at least equal to the time of lethality. Thus, all or substantially all of the pests 29 are destroyed.

And, of course, if there is more than one kind of pest 29 infesting the product 31, a "worst case" time of lethality is preferably selected, i.e., time required to kill the "hardest to kill" animal 29. There is no known data regarding such times for particular types and species of animals. However, such times can be determined by very simple experiment after identifying the few particular types of pests 29 which are most likely to be encountered. Some examples will help.

It has been found that the time of lethality (starting when water vapor has substantially completely displaced the oxygen) for a small mammal 29c is about 20 minutes, for a tobacco beatle is about 45 minutes and for a cricket is about 3 hours. While not subscribing to any particular theory, it appears there may be some correlation between the time of lethality and body weight of the animal 29. There may also be a correlation with metabolism rate and, therefore, with animal species.

To shorten the time required to carry out the method, the chamber 33 may be evacuated with a vacuum 37 system providing a first, more rapid evacuation rate to quickly bring the chamber pressure down to that at which the water in the product 31 boils. However, a less "aggressive" slower evacuation rate may be used to maintain such pressure. When selecting the rapid evacuation rate, one must be sensitive to several factors. One is whether or not the product 31 is packed in receptacles 43 and, if so, whether the receptacles 43 vent readily or whether they are more tightly sealed. For reasons mentioned above, more tightly sealed receptacles 43 may require even a more moderate initial evacuation rate.

Another factor is whether the product 31 will be affected by a rapid decline in pressure. It has been found that products 31 such as grain and lumber are not particularly affected thereby. On the other hand, products 31 with relatively non-porous skins, e.g., grapes, may require a more modest evacuation rate. It has also been found that at least as to grapes, a too-rapid evacuation rate may cause the skin to wrinkle when ambient pressure is restored at the conclusion of the process. A rate of pressure change not in excess of about 3.0" Hg per second is recommended for delicate products 31 such as grapes. Other aspects of processing such delicate products 31 are described below in connection with use of an inert gas.

Another aspect of the invention involves a substantially leakproof chamber 33, i.e., one that is sealed to prevent entry of surrounding ambient air. In that instance, the pressure in the chamber 33 is reduced by evacuating the chamber 33 with the vacuum system 37 and the pressure maintaining step can then include disabling the vacuum system 37, thereby avoiding further chamber evacuation.

In yet another aspect of the invention, the step involving maintaining an oxygen-depleted condition includes flowing a gas into the chamber 33, thereby permitting chamber pressure to rise back toward or to atmospheric ambient pressure. The gas may include an inert gas from a tank 45 or a fumigant from a vessel 47a.

When an inert gas is used, bringing chamber pressure upward toward or to ambient pressure permits simply holding the product in the chamber 33 without operating (or at least without continuously operating) the vacuum system 37. This approach is useful with delicate products 31 where dehydration caused by holding a low pressure for a longer period causes product damage or undesirable changes in product appearance.

With such products 31, the "boiling point pressure" is held for a relatively short time, i.e., only 10 minutes or so, as needed to assure complete displacement of oxygen by water vapor. Then the chamber is "purged" by introducing an inert gas (nitrogen or carbon dioxide, for example) and thereby raising the chamber pressure toward or to ambient. Notwithstanding that chamber pressure is increased to above the boiling temperature of water (at the product temperature), the chamber 33 is maintained in an oxygen-depleted condition and the animals 29 in the product 31 are thereby killed.

When the gas is a poison gas fumigant, this usually shortens the process time. However, this is at the expense of adding some complexity to the method and the apparatus 10, at least because such fumigant must be ventilated from the product 31 before such product 31 presented for human consumption. That is not to say that the animals 29 are always killed more quickly by exposure to fumigant than by merely suffocating in an oxygen-depleted environment. In fact, it has been found that some types of insects 29a "close off" their oxygen intake apertures in the presence of fumigant and this causes suffocation.

Where fumigant is used and after the chamber pressure is raised back toward or to atmospheric pressure by flowing fumigant into such chamber 33, the chamber 33 is re-evacuated to reduce the chamber pressure at least to the boiling point of the water in the product. Fumigant remaining in the chamber is displaced by water vapor. The displaced fumigant can be recovered to a second vessel 47b to preventing such fumigant from being released into the atmosphere.

Figure 2:
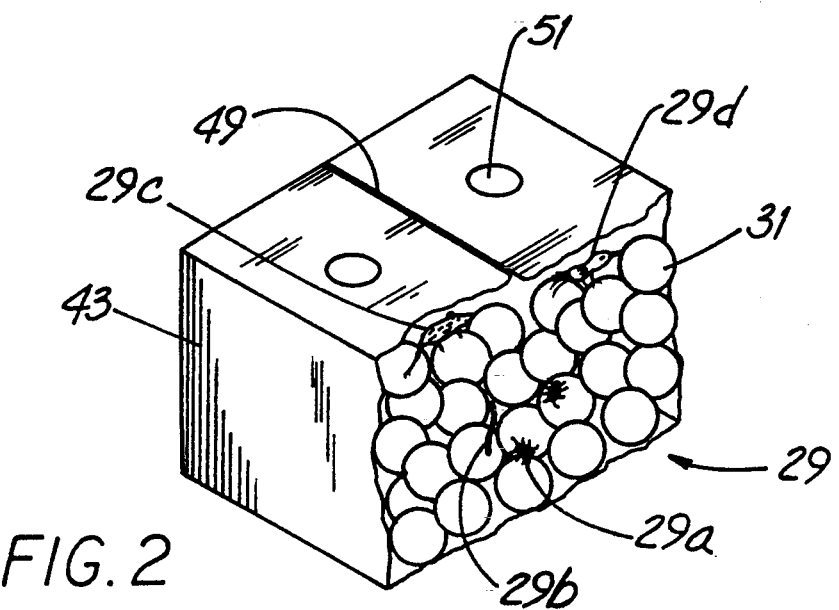
FIG. 2 is a perspective view of a representative receptacle, with part broken away, containing a water-bearing bearing product and illustrating various forms of animals which may infest the product.
Figure 3:
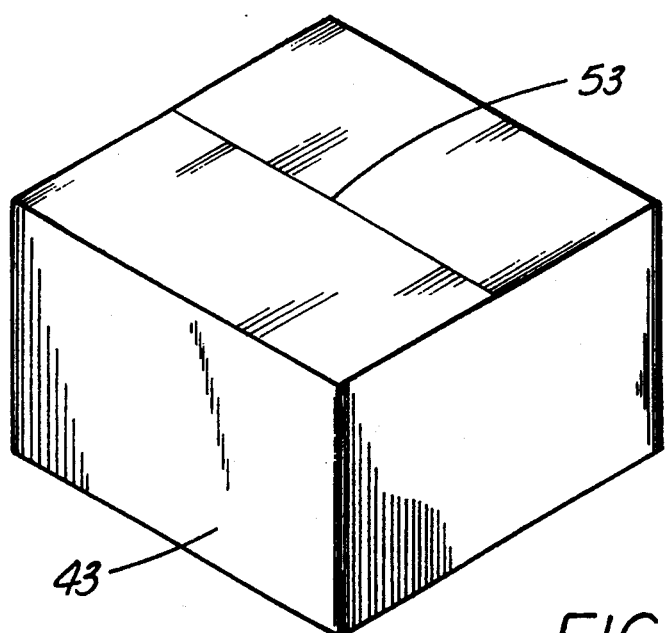
FIG. 3 is a representative perspective view of a tightly-sealed receptacle.

Referring particularly to FIGS. 2 and 3, certain kinds of products 31, fruit for example, are packed in receptacle 43, e.g., a box, crate, container or the which may have a maximum pressure differential rating avoid receptacle rupture. Such receptacles may (like that of FIG. 2) have relatively large area leakage paths in the form of cracks 49 or other types of openings 51. If there are such paths, they permit the pressure in the receptacle 43 to rather closely "follow" the changing pressure in the chamber 33. Thus, the pressure differential rating is not exceeded and, usually, not even approached.

However, there may be receptacles 43 (like that of FIG. 3) of products 31 which are quite tightly sealed and, thus, have leakage paths 53 of very small cross-sectional area. In that instance, the pressure reducing step includes reducing the pressure at a rate to avoid exceeding the receptacle pressure differential rating and, thus, avoid "blowing out" the receptacle 43.

Similarly, the pressure maintaining step is followed by the step of increasing the pressure in the chamber 33 at a rate to avoid exceeding the pressure differential rating of the receptacle 43. This avoids deforming or crushing the receptacle 43 (and perhaps the product 31 within) as would otherwise result from having a pressure exterior the receptacle 43 which exceeds its internal pressure by a value greater than a maximum pressure differential rating.

Figure 4:
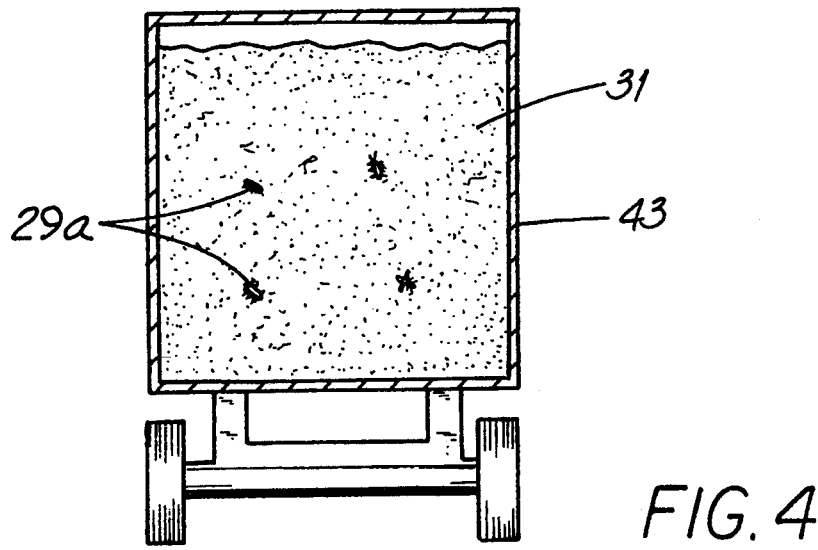
FIG. 4 is a cross-sectional elevation view of a representative transport vehicle, e.g., rail car or truck, loaded with exemplary product in the form of bulk grain.
Figure 5:
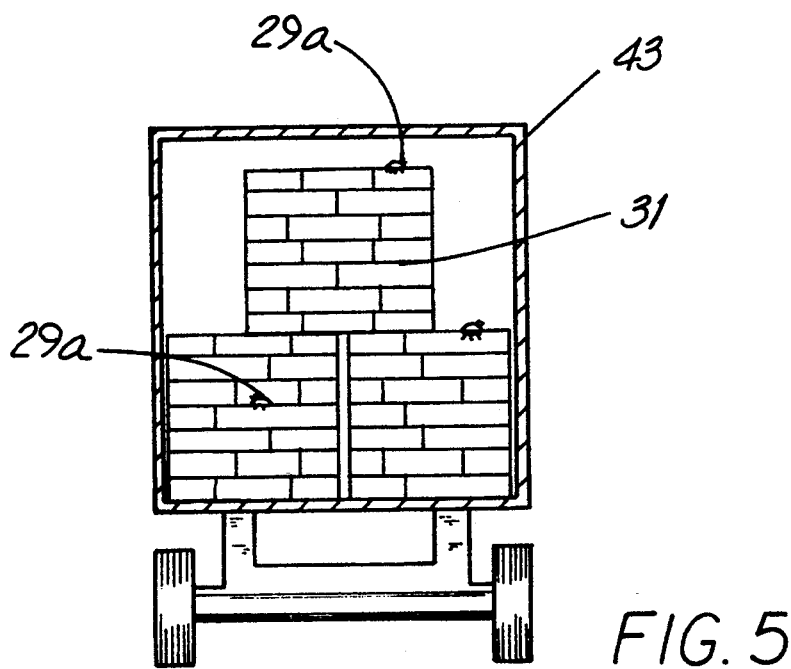
FIG. 5 is a cross-sectional elevation view of a representative transport vehicle, e.g., rail car or truck, loaded with exemplary product in the form of lumber.

FIG. 4 shows a "receptacle" 43 embodied as a transport vehicle loaded with bulk product 31 such as grain. Such grain is infested with insects 29a. FIG. 5 shows a similar receptacle 43 loaded with bulk product 31 such as sawed lumber. It, too, is infested with insects 29a. It is to be appreciated that if the vehicular receptacle 43 is sufficiently well sealed and constructed to withstand the interior-to-exterior pressure differentials, the product 31 can be processed in situ rather than moving it to a separate receptacle 43 for insertion into a chamber 33.

Elsewhere, this specification refers to a standard International Standards Organization (ISO) receptacle. As an example of a maximum rate of pressure change as discussed above, the strength and "leakiness" of an ISO receptacle permits a rate of change in pressure from 29.92" Hg Abs. to about 0.9" Hg Abs. in about 5 minutes.

The summary mentions how the new method can be used for drug interdiction and law enforcement purposes. Referring particularly to FIG. 8, as the pressure reducing step evacuates gas from the chamber 33, such step is accompanied by the step of flowing the evacuated gas through a controlled substance analyzer 55. Or, as represented by the dashed path 57 in FIG. 8, the evacuated gas may be "stored" temporarily in a separate container 59 and flowed through a controlled substance analyzer 55 following the pressure reducing step.

Figure 6:
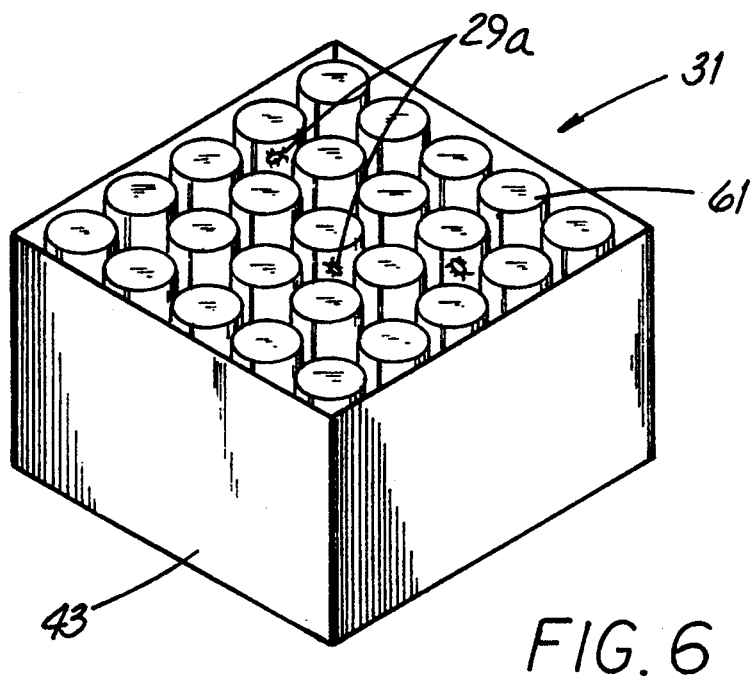
FIG. 6 is a perspective view of a receptacle containing a dry product, e.g., glass jars, infested with insects.

In another aspect of the invention, the method need not rely upon the presence of water in the product 31. Referring to FIG. 6, the exemplary receptacle 43 is assumed to contain a dry product 31 such as glass jars 61. In a method for killing an animal pest (such as insects 29a) having a nominal body temperature and infesting the dry product 31, the method including placing the dry product 31 in a chamber 33 having at least some oxygen therewithin and reducing the pressure in the chamber 33 below atmospheric pressure.

It has been found that water vaporizing or "boiling" from the pest's body prevents the pest 29a from replenishing its oxygen supply, even in the presence of oxygen in the surrounding environment. The method comprises, in either order, the steps of reducing the pressure in the chamber 33 at least to that at which in the pest's body boils and determining a pest oxygen-depleted time of lethality. Such method also includes the step of maintaining the pressure in the chamber 33 substantially equal to such boiling point for a time at least equal to the time of lethality. This step permits water in the pest's body to vaporize, thereby substantially preventing oxygen from entering the body.

The Inventive Apparatus

Aspects of the invention also involve an apparatus 10 for killing animal pests 29 infesting a water-bearing or a dry product 31. Referring again to FIG. 8, such apparatus 10 includes a pair of chambers 33a, 33b and a vacuum system 37 having a vacuum pump 63 for reducing the pressure in a chamber 33 below atmospheric ambient pressure. Such system 37 is capable of reducing the pressure in a chamber 33 to that at which water at the temperature of the water-bearing or the dry product 31 boils. More specifically, such system 37 should be capable of reducing the pressure in a chamber 33 to at least 2" Hg Abs. and, more preferably, capable of reducing such pressure to at least about 1.0" Hg Abs. and even down to about 0.02" Hg Abs.

The apparatus 10 may also include a tank 45 containing an inert gas and/or a vessel 47a containing a poison gas such as a fumigant. It may also include a vessel 47b selectively connected to a chamber 33 for recovering the poison gas from the chamber 33. And it may also include a controlled substance analyzer 55 and a container 59 for holding gas drawn from a chamber 33 before such gas is routed through the analyzer 55. The symbols 64 through 75 represent valves used to interconnect a chamber 33 with system components and with atmospheric ambient air and the symbols 76, 77 represent recovery pumps. FIG. 8 shows two chambers 33a, 33b in parallel so that one can be used for killing pests 29 while the other is being loaded, unloaded or repaired. The following describes how the components shown in FIG. 8 are connected and how they operate.

After understanding a few basic principles of the apparatus 10, it will be apparent how the valves 64–75 are set to an "open" or "closed" state to achieve a particular type of operation of the apparatus 10. It will be appreciated that the valve 72 is on the vacuum side of the pump 63 and that fluid flow in pipe section 79 is in the direction of the arrow 81. It is also to be appreciated that the lines 83 and 85 connected to the valves 67 and 73, respectively, are open to atmosphere.

A first purge line 87 connects the first vacuum chamber 33a to a first purge valve 69 and, similarly, a second purge line 89 connects the second vacuum chamber 33b to a second purge valve 68. The first and second purge valves 69, 68 are connected to the atmospheric purge valve 67, the inert gas purge valve 66, the fumigant purge valve 65, and to the pump discharge valve 64. The atmospheric purge valve 67 can be selectively open to atmospheric air.

In operation, the water-bearing or dry product 31 to be treated is loaded into the first chamber 33a through the door 35a. The door 35a is closed and seals to the body of the chamber 33a. And it should be noted that as chamber pressure declines, the door 35a is urged to tighter sealing engagement.

To evacuate the air from chamber 33a (and thereby reduce the chamber pressure below ambient), vacuum valve 70 and atmospheric discharge valve 73 are opened. Vacuum valve 71, purge valve 69 pump discharge valve 64, fumigant recovery valve 74 and valve 75 are closed, the vacuum pump 63 is activated and pump suction valve 72 is opened. The vacuum pump 63 draws the air, including the oxygen, out of the chamber 33a. The rate of evacuation of air from the chamber 33a depends, as described above, upon the type of product 31 and the strength and "leakiness" of the receptacle 43.

As the chamber 33a is evacuated, its pressure is monitored. When the chamber declines to the pressure at which water boils at the product temperature (sometimes referred to as the "dewpoint pressure"), the pressure will stabilize at or slightly below such pressure.

Such stabilization is due to the evolution of large volumes of water vapor from the product 31. The following explains why stabilization occurs.

Typical vacuum pumps (like pump 63) are positive displacement devices and pump at a fixed rate. Prior to the dewpoint pressure being reached, the vacuum pump 63 is removing air from a chamber 33a at this fixed rate and the pressure of the chamber 33a decreases. When the water in the product 31 starts to boil, the pressure reaches equilibrium (stops declining) because the rate at which water vapor boils out of the product 31 matches the rate the pump 63 is removing vapor mixing with gas from the chamber 33a. The pressure would remain essentially constant until all of the water is removed from the product 31 but, in practice, usually only a small percentage of the water is vaporized and removed. It is usually undesirable to remove all such water from the product 31.

Once the pressure has stabilized, the chamber pressure is maintained for a time (about 10 minutes or so) necessary to cause the oxygen to be displaced by water vapor. Such oxygen-depleted condition is then maintained for the time necessary to effectively exterminate any animals 29 in the chamber 33a. It has been observed that the time such condition is to be maintained is related to the size and species of animal 29 to be exterminated. For mammals 29c, such time is about 20 minutes; for small insects 29a, it is about 45 minutes and for large insects 29a, it is about 3 hours.

Additional Informational Details

The following information will help use the exemplary apparatus 10 in the most economical and environmentally-responsible way. Since the preferred apparatus 10 uses two vacuum chambers 33a, 33b, the vacuum in, e.g., the chamber 33a can be used to "draw down" the pressure in the chamber 33b when the latter is to be used to process product.

While the first chamber 33a is being evacuated, the second chamber 33b can be loaded with product 31. When animal extermination has been completed in the first chamber 33a, the vacuum in such chamber 33a may be used to partially evacuate the chamber 33b. This is accomplished by closing the valve 72, maintaining the valves 68, 69 closed and opening the valves 70, 71. This causes the air in the chamber 33b (which is at atmospheric pressure at the start of this procedure) to flow to the chamber 33a, thereby partially evacuating air from the chamber 33b.

When the internal pressures of the chambers 33a, 33b have substantially equalized, the valve 70 is closed, the valve 71 remains open, and the pump suction valve 72 is opened to evacuate the remaining air from the chamber 33b. At the same time, the valves 67, 69 are opened to admit atmospheric air into the chamber 33a until it reaches atmospheric pressure. Then the chamber door 35a is opened and the products 31 removed. The chamber 33a is then re-loaded with new products 31 to be treated.

The foregoing explanation mentioned how inert gas is beneficially used where the method is employed with delicate products 31 such as fruit. A variation involving using inert gas repetitively "cycles" the chamber pressure between about ambient and dewpoint pressures to achieve an oxygen-depleted state in the chamber 33. Inert gas is flowed to the chamber 33 to "purge," i.e., to raise the pressure each time.

Repeating the cycle dilutes the oxygen level in the chamber 33 in proportion to the initial and final pressures. For example, starting with air in a chamber 33 at 29.92" Hg Abs., evacuating the chamber 33 to 2" Hg Abs. and then purging with inert gas to raise the pressure back to 29.92" Hg Abs. reduces the oxygen concentration to 2/29.92 or about 6.6% of its original value. Since air is about 21% oxygen, the resulting gas in the chamber 33 will be about 1.4% oxygen after one cycle.

Repeating the cycle reduces the oxygen concentration to 6.6% of 1.4% or about 0.09% oxygen. The cycle is repeated as necessary until the oxygen concentration in the chamber 33 is insufficient to support the life of the animal 29 being killed.

A single cycle is lethal to mammals 29c while two or three cycles is needed to kill insects 29a. It is to be noted that the chamber 33 is preferably still held in a low-oxygen-concentration state for the pest oxygen-depleted time of lethality. Thus, the overall processing time is longer. This variation also uses greater quantities of inert gas than either of the previously described methods. However this may be the only acceptable process for delicate products 31.

If a fumigant is used in the method, such fumigant can be recovered to the recovery tank 47b. Using the chamber 33a as an example, fumigant recovery is by opening the valves 67, 79, 70, 72 and 74, closing all other valves, energizing the pumps 63, 76 and forcing the fumigant into the vessel 47b.

Additional aspects of the invention involve sampling the gas evacuated from the chambers 33, either by routing such gas directly to an analyzer 55 for detecting a contraband controlled substance or by routing it to a holding container 59 for later introduction to the analyzer 55. And the controlled substance analyzer 55 can be replaced or supplemented by an analyzer (not shown) for detecting residual pesticides (perhaps unlawful pesticides) on the product 31.

The following explains why the new method does not significantly dry out the product 31 being processed. Organic (water-bearing) products 31 have relatively high moisture content. For example, freshly sawed lumber is often over about 70% moisture; dried lumber is about 12% moisture. Freshly-cut christmas trees are about 38–45% moisture.

Grain is about 20–30% moisture at harvest and is dried to about 12–14% for storage. Leafy crops such as tobacco and cabbage are about 75–80% moisture at harvest and are dried to about 50% for storage. Fruits are often about 90% moisture at harvest and are dried to about 50% moisture for storage.

When pressure in a chamber 33 is reduced to the boiling temperature of water at the product temperature, very little water is required to be boiled off to substantially fill the chamber with such vapor. This is so since the water vapor occupies a very large volume at the pressures involved and not a great deal of water (as measured in its liquid state) is needed to deplete the oxygen in the chamber 33.

For example, at a pressure of about 0.8" Hg Abs. and a product temperature of about 70° F., one liter of water becomes 55,000 liters of water vapor. At about 0.4" Hg Abs., one liter of water becomes 110,000 liters of water vapor.

It is assumed that an ISO receptacle 43 having a length of about 40 feet is loaded with grain at a 20% moisture content. The entire quantity of grain product 31 (with its water) weighs about 20,000 kg and about 20% of such weight, or 4000 kg, is water.

An exemplary vacuum pump 63 displacing 50,000 liters/minute removes one-half (½) kg of water per minute at an equilibrium pressure of 0.75" Hg. Abs. At this rate, it would take 8,000 minutes or 5½ days of continuous pumping to remove all of the water from the exemplary receptacle 43 full of grain. Since the oxygen-depleted condition is typically maintained for about 3 hours or less, little change (90 kg water removed from 20,000 kg of grain in 3 hours) occurs in the water content of the product 31 even if the exemplary pumping rate is maintained. It is apparent, then, that total dehydration of the product 31 would take a very long time.

Referring again to FIGS. 4 and 5, it has been discovered that the new method kills animals 29 much more rapidly than certain conventional methods using fumigant. This is so even though the animals 29 (such as insects 29a) occur deep within the load of product as particularly illustrated in FIG. 4.

When a chamber 33 is brought to a reduced pressure as described above, pressure in the product 31 deep in the interior of the receptacle 43 "follows" the pressure prevailing at, say, valve 70 very closely. In other words, there is very little "pressure gradient" between the interior and the surface portions of the load of product 31. Of course, the fundamental reason why the new method is so effective is that it substantially entirely depletes the oxygen in the chamber 33.

And there is a related factor which helps explain why the new method is so effective in quickly killing insects 29a. Insects 29a (which can remain active down to relatively low pressures, e.g., 1.0" Hg Abs.) have body cavities largely filled with blood having an oxygen "reserve" entrained therein. Reducing the pressure in the chamber 33 as described above causes such oxygen to "outgas," i.e., to migrate out of the body of the insect 29a, thus depleting its oxygen reserve.

As another example of the efficacy of the new method, if an insect 29a is placed in an oxygen-free volume of inert gas at atmospheric pressure, such insect 29a may survive for 10-20 hours on its blood-entrained oxygen reserve. With the new method, this time is reduced by a factor of about four.

In contrast, it takes a long time for conventionally-employed fumigant to diffuse through a load of product 31 and kill animals 29. And such fumigant may "lodge" on the contents of the chamber 33 without penetrating sufficiently deeply into the load of product 31.

While only a few preferred embodiments of the new method and apparatus 10 are described, it is to be understood clearly that these are by way of example and that other embodiments are contemplated.

I claim:

1. In a method for killing animal pests infesting a product bearing water at a temperature and including placing the product in a chamber having at least some oxygen therewithin and reducing the pressure in the chamber below atmospheric pressure, the improvement comprising the steps of:
   reducing the pressure in the chamber at least to that pressure at which the water boils at the temperature;
   displacing oxygen in the chamber with water vapor until the chamber is substantially oxygen depleted; and in any order with respect to the preceding steps, the step of:
   determining a pest oxygen-depleted time of lethality; and further including the step of:
   maintaining the oxygen-depleted condition for a time at least equal to the time of lethality.

2. The method of claim 1 wherein the pressure in the chamber is reduced by evacuating the chamber with a vacuum system providing a first, more rapid evacuation rate or a second, slower evacuation rate and wherein:
   the pressure reducing step includes evacuating the chamber at the more rapid evacuation rate until the pressure in the chamber is substantially equal to that pressure at which the water boils;
   and the oxygen-displacing step includes:
   evacuating the chamber at the slower evacuation rate to maintain the pressure substantially equal to that at which the water boils.

3. The method of claim 1 wherein the pressure in the chamber is reduced by evacuating the chamber with a vacuum system and wherein:
   the chamber is sealed to prevent entry of surrounding ambient air; and,
   the oxygen-depleted condition is maintained even though the vacuum system is disabled to avoid further chamber evacuation.

4. The method of claim 1 wherein the condition maintaining step includes flowing a gas into the chamber.

5. The method of claim 4 wherein the gas is an inert gas.

6. The method of claim 4 wherein the gas includes a fumigant.

7. The method of claim 6 wherein the fumigant flowing step includes flowing fumigant into the chamber to raise the chamber pressure toward atmospheric pressure and the method includes the further steps of;
   re-evacuating the chamber to reduce the chamber pressure at least to that pressure at which the water in the product boils; and,
   displacing fumigant remaining in the chamber with water vapor.

8. The method of claim 7 wherein the fumigant displacing step is accompanied by the step of recovering the displaced fumigant, thereby preventing such fumigant from being released into the atmosphere.

9. The method of claim 8 wherein the re-evacuating step includes recovering fumigant evacuated from the chamber, thereby preventing such fumigant from being released into the atmosphere.

10. The method of claim 1 wherein:
    the product is packed in receptacles;
    the receptacle has a maximum pressure differential rating to avoid receptacle rupture; and,
    the pressure reducing step includes reducing the pressure at a rate to avoid exceeding the receptacle pressure differential rating.

11. The method of claim 1 wherein:
    the product is packed in receptacles;

12. The method of claim 1 wherein the pressure reducing step evacuates gas from the chamber and the pressure reducing step is accompanied by the step of:
    flowing the evacuated gas through a controlled substance analyzer for detecting a contraband controlled substance in the chamber.

13. The method of claim 1 wherein the pressure reducing step evacuates gas from the chamber and the pressure reducing step is followed by the step of:

flowing the evacuated gas through a controlled substance analyzer for detecting a contraband controlled substance in the chamber.

14. The method of claim 1 wherein the pressure the chamber is reduced to at least 2" Hg absolute.

15. The method of claim 14 wherein the pressure in the chamber is reduced to about 1.0" Hg absolute.

the receptacle has a maximum pressure differential rating to avoid receptacle rupture; and, the condition maintaining step is followed by the step of increasing the chamber pressure at a rate to avoid exceeding the receptacle pressure differential rating.

16. In a method for killing an animal pest having a nominal body temperature and infesting a dry product, the method including placing the product in a chamber having at least some oxygen therewithin and reducing the pressure in the chamber below atmospheric pressure, the improvement comprising, in either order, the steps of:

reducing the pressure in the chamber at least to that pressure at which water at the pest body temperature boils;

determining a pest oxygen-depleted time of lethality;

and further including the step of:

maintaining, for a time at least equal to the time of lethality, the pressure in the chamber substantially equal to that pressure at which water at the pest body temperature boils.

17. The method of claim 16 wherein the pressure maintaining step includes permitting water in the pest body to vaporize, thereby substantially preventing from entering the body.

* * * * *

UNITED STATES PATENT AND TRADEMARK OFFICE
CERTIFICATE OF CORRECTION

PATENT NO. : 5,365,692
DATED : November 22, 1994
INVENTOR(S) : Keith W. Gustafson It is certified that error appears in the above-indentified patent and that said Letters Patent is hereby corrected as shown below:

In column 3, line 8, delete "of" and insert --or--.

In column 16, line 58, claim 11 should read as follows:

--11. The method of claim 1 wherein:
-the product is packed in receptacles;
-the receptacle has a maximum pressure differential rating to avoid receptacle rupture; and,
-the condition maintaining step is followed by the step of increasing the chamber pressure at a rate to avoid exceeding the receptacle pressure differential rating.--

In column 17, line 6, claim 15 should read as follows:

--15. The method of claim 14 wherein the pressure in the chamber is reduced to about 1.0" Hg absolute.--

In column 18, line 15, after "preventing" insert --oxygen--.

Signed and Sealed this

Twenty-first Day of March, 1995

Attest:

BRUCE LEHMAN

Attesting Officer

Commissioner of Patents and Trademarks